(12) United States Patent
Jung et al.

(10) Patent No.: US 8,052,314 B2
(45) Date of Patent: Nov. 8, 2011

(54) OPTICAL FIBER ILLUMINATION DEVICE

(75) Inventors: Sun-Tae Jung, Yongin-si (KR);
Joo-Hoon Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 247 days.

(21) Appl. No.: 12/473,856

(22) Filed: May 28, 2009

(65) Prior Publication Data

US 2010/0027287 A1 Feb. 4, 2010

(30) Foreign Application Priority Data

Jul. 30, 2008 (KR) .................. 10-2008-0074619

(51) Int. Cl.
*F21V 7/04* (2006.01)

(52) U.S. Cl. .................. 362/558; 362/551; 362/560

(58) Field of Classification Search .................. 362/551, 362/552, 554, 556, 560, 558
See application file for complete search history.

(56) References Cited

U.S. PATENT DOCUMENTS

| 6,350,050 | B1* | 2/2002 | Buelow et al. | 362/551 |
| 6,418,267 | B1* | 7/2002 | Lowry | 385/147 |
| 6,618,528 | B2* | 9/2003 | Lowry | 385/120 |
| 7,798,892 | B2* | 9/2010 | Aiello et al. | 454/184 |

FOREIGN PATENT DOCUMENTS

| KR | 2001-035201 | 2/2001 |
| KR | 1020020057889 | 7/2002 |

* cited by examiner

*Primary Examiner* — John A Ward
(74) *Attorney, Agent, or Firm* — The Farrell Law Firm, P.C.

(57) ABSTRACT

Disclosed is an optical fiber illumination device including a light source for outputting light; a coupler for converging the light input from the light source through multiple reflection; and an optical fiber to which the converged light is input.

8 Claims, 10 Drawing Sheets

OPTICAL FIBER ILLUMINATION DEVICE

PRIORITY

This application claims priority under 35 U.S.C. §119(a) to an application entitled "Optical Fiber Illumination Device" filed with the Korean Intellectual Property Office on Jul. 30, 2008, and assigned Serial No. 10-2008-0074619, the contents of which are incorporated herein by reference.

BACKGROUND OF THE INVENTION

1. Field of the Invention

The present invention relates to an illumination device, and more particularly to an illumination device using an optical fiber.

2. Description of the Related Art

An illumination device using an optical fiber has been recently widely used for interior/exterior designs. The optical fiber illumination device may be used in locations with high humidity or high temperature, because an optical fiber generates no heat, has an excellent moisture-proof/heat-resistant characteristic, and allows the light input from a light source to be transferred to a position far away from the light source. In the case where the light source and the to-be-illuminated area are spaced far apart from each other, the optical fiber illumination device has an advantage in that the light source, power supply for driving the light source, and a driving circuit can be disposed at a position not subjected to the influence of moisture or temperature.

Japanese Laid-Open Patent Publication No. 2001-35201, to Tamaoki Satoshi, published on Feb. 9, 2001, entitled "Illumination Device", discloses an illumination device using a light emitting diode and an optical fiber array, in which the light emitting diode has a light emitting surface directly facing one end (a light receiving end) of the optical fiber array, and the light coupled within the optical fiber array is emitted from the other end (a light emitting end) of the optical fiber array.

However, in Satoshi, much of the light output from the light emitting diode is lost without being coupled with the optical fiber array.

Especially in the case where the area of a light receiving end of an optical fiber or an optical fiber array is very small compared to the light divergence angle of a light source, or the area of the light emitting surface of the light source is very large compared to the area of the light receiving end of the optical fiber or the optical fiber array, such optical coupling loss significantly increases.

FIG. 1 is a view illustrating optical coupling loss between a light emitting diode and an optical fiber in a conventional apparatus. A light emitting surface 112 of a light emitting diode 110 and an end 122 of an optical fiber 120 face each other, and the light divergence angle of the light emitting diode 110 is very large compared to the area of the end 122 of the optical fiber 120. Thus, only some of the light output from the light emitting diode 110 is coupled within the optical fiber 120, and much of the output light is lost without being coupled with and transmitted by the optical fiber 120.

FIG. 2 is a view illustrating optical coupling loss between multiple light emitting diodes and an optical fiber. Light emitting surfaces of red, green, and blue light emitting diodes 132, 134, and 136 face one end 142 of an optical fiber 140, and the light divergence angle of each of the light emitting diodes 132, 134, and 136 is very large compared to the area of the end 142 of the optical fiber 140. Thus, only some of the light output from each of the light emitting diodes 132, 134, and 136 is coupled within the optical fiber 140, and much of the output light is lost without being coupled with the optical fiber 140. Also, when the optical fiber 140 is positioned nearer to the red light emitting diode 132 than to the green and blue diodes 134 and 136, as shown FIG. 2, i.e. when the longitudinal axis of the optical fiber 140 is aligned toward the red light emitting diode 132, such alignment causes color non-uniformity (the prominence of red) in the light output from the optical fiber 140.

SUMMARY OF THE INVENTION

Accordingly, the present invention has been made to solve the above-mentioned problems occurring in conventional systems.

In accordance with an aspect of the present invention, there is provided an optical fiber illumination device which minimizes optical coupling loss and color non-uniformity.

In accordance with another aspect of the present invention, there is provided an optical fiber illumination device which is appropriate for interior/exterior designs of a mobile terminal.

The optical fiber illumination device according to an aspect of the present invention includes a light source for outputting light; a coupler for converging the light input from the light source through multiple reflection; and an optical fiber to which the converged light is input.

The optical fiber illumination device according to another aspect of the present invention includes a housing within which both end portions of an optical fiber are disposed in opposite directions; at least one light source disposed within the housing; and a couple of couplers disposed at both sides of the at least one light source, the couplers being disposed in such a manner that a first of each coupler faces an end of the corresponding end portion of the optical fiber, and converging light input from the at least one light source by multiple reflection.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. In the following description of the present invention, a detailed description of known functions and configurations incorporated herein is omitted to avoid making the subject matter of the present invention unclear.

Figure 1:
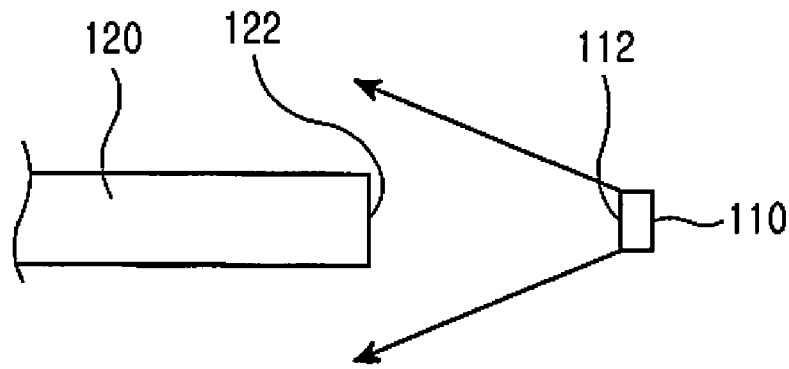
FIG. 1 is a view illustrating optical coupling loss between a light emitting diode and an optical fiber.
Figure 2:
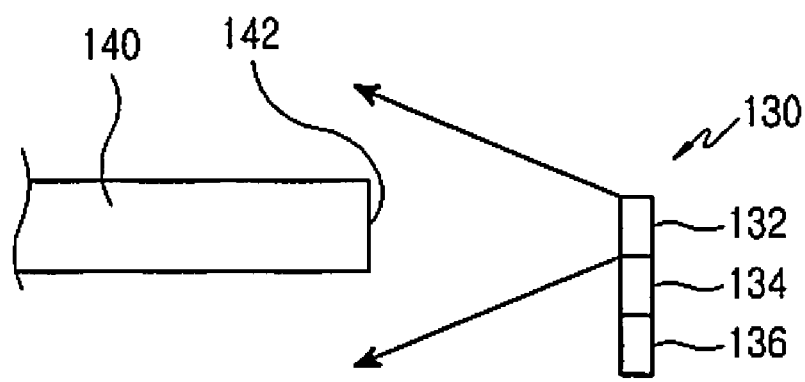
FIG. 2 is a view illustrating optical coupling loss between multiple light emitting diodes and an optical fiber.
Figure 3:
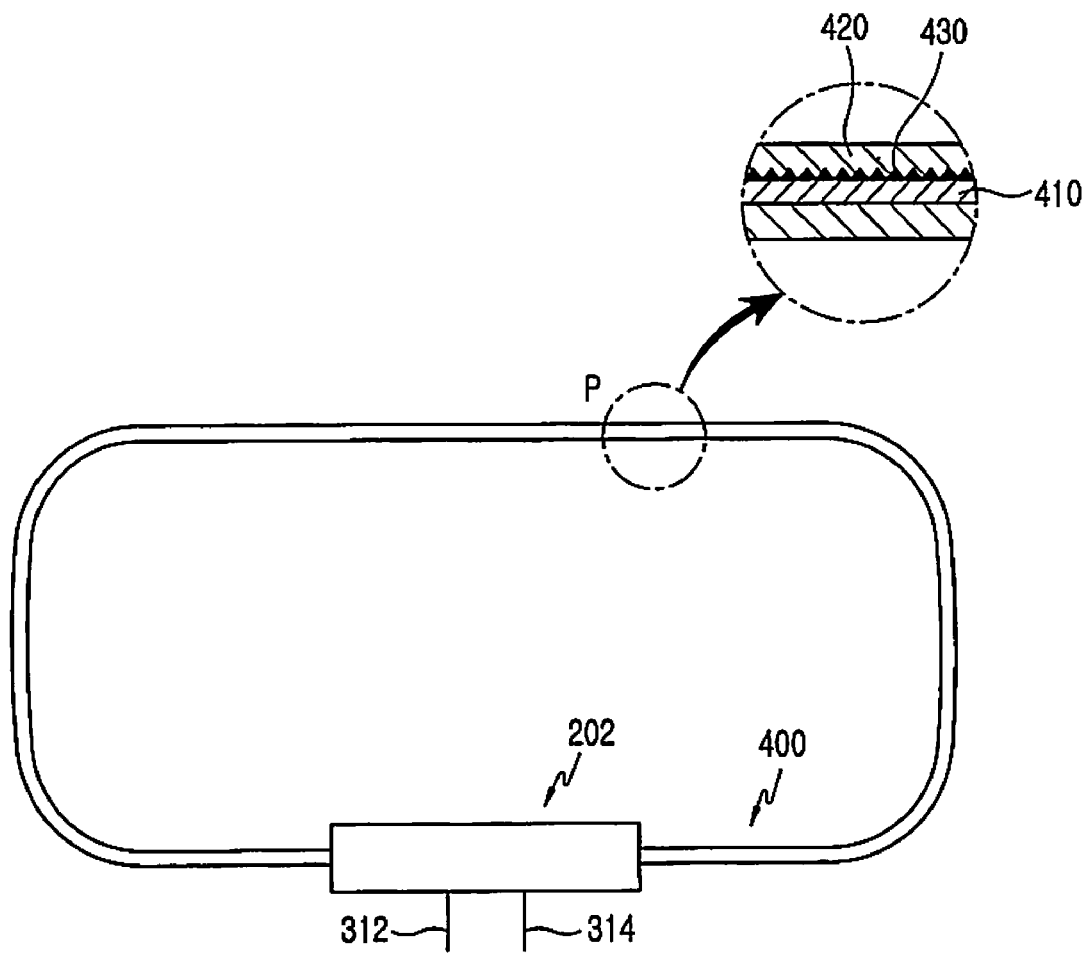
FIG. 3 illustrates an optical fiber illumination device according to a first preferred embodiment of the present invention.

FIG. 3 illustrates an optical fiber illumination device according to a first preferred embodiment of the present invention. The optical fiber illumination device 200 includes a light source module 202 and an optical fiber 400. The light source module 202 includes first and second connector pins 312 and 314 for connecting with an external circuit board (not shown), generates first light and second light according to a control signal and power supply from the external circuit board through the connector pins 312 and 314, and rotates the first light and the second light on the optical fiber 400 in a clockwise and counterclockwise direction, respectively.

As shown in an enlarged cross-sectional view P of FIG. 3, which illustrates a part of the optical fiber, the optical fiber 400 includes a core 410 having a relatively high refractive index and a cladding 420 having a relatively low refractive index.

The optical fiber 400 guides the light coupled therewithin. The coupled light propagates from a first end to a second end of the optical fiber 400. The first light and the second light move toward the inside of the core 410 through total internal reflection in the boundary between the core 410 and the cladding 420. The optical fiber 400 includes a light extraction pattern 430 in a boundary portion between the core 410 and the cladding 420, and the light extraction pattern 430 allows the light moving within the core 410 to be emitted to the outside of the optical fiber 400. The light extraction pattern 430 is capable of scattering, reflecting (irregular reflection or mirror reflection), diffusing or transmitting (through a medium having a reflective index higher than that of the cladding 420) the incident light. The light extraction pattern 430 is preferably formed by scratch, printing, etching, coating or a combination thereof. Also, as the optical fiber 400, a conventional plastic optical fiber may be used.

In the present embodiment, although the optical fiber 400 additionally includes the light extraction pattern 430 to allow the light moving within the core 410 to be emitted to the outside of the optical fiber 400, the use of a scattering substance containing optical fiber does not require an additional light extraction means. In other words, the scattering substance containing optical fiber includes a core which guides light, and a cladding which surrounds the core in such a manner that the light is shielded within the core. The core contains a scattering substance for scattering incident light and emitting the scattered light to the outside of the optical fiber. The scattering substance-containing optical fiber may be obtained by adding a scattering substance, together with a refractive index controlling substance, to a raw glass material in a core fabrication process of an optical fiber preformed for optical fiber drawing.

Figure 4:
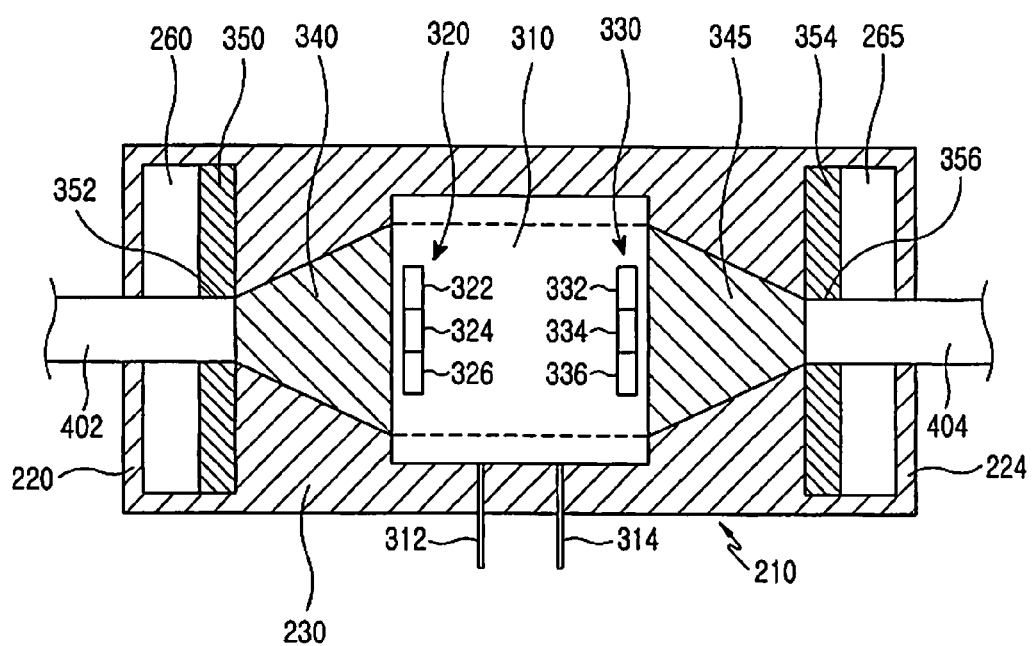
FIG. 4 is a cross-sectional view illustrating a light source module as shown in FIG. 3.

FIG. 4 is a cross-sectional view illustrating the light source module 202. The light source module 202 includes a circuit board 310, first and second light sources 320 and 330, first and second couplers 340 and 345, first and second light shielding members 350 and 354, and a housing 210.

Figure 5:
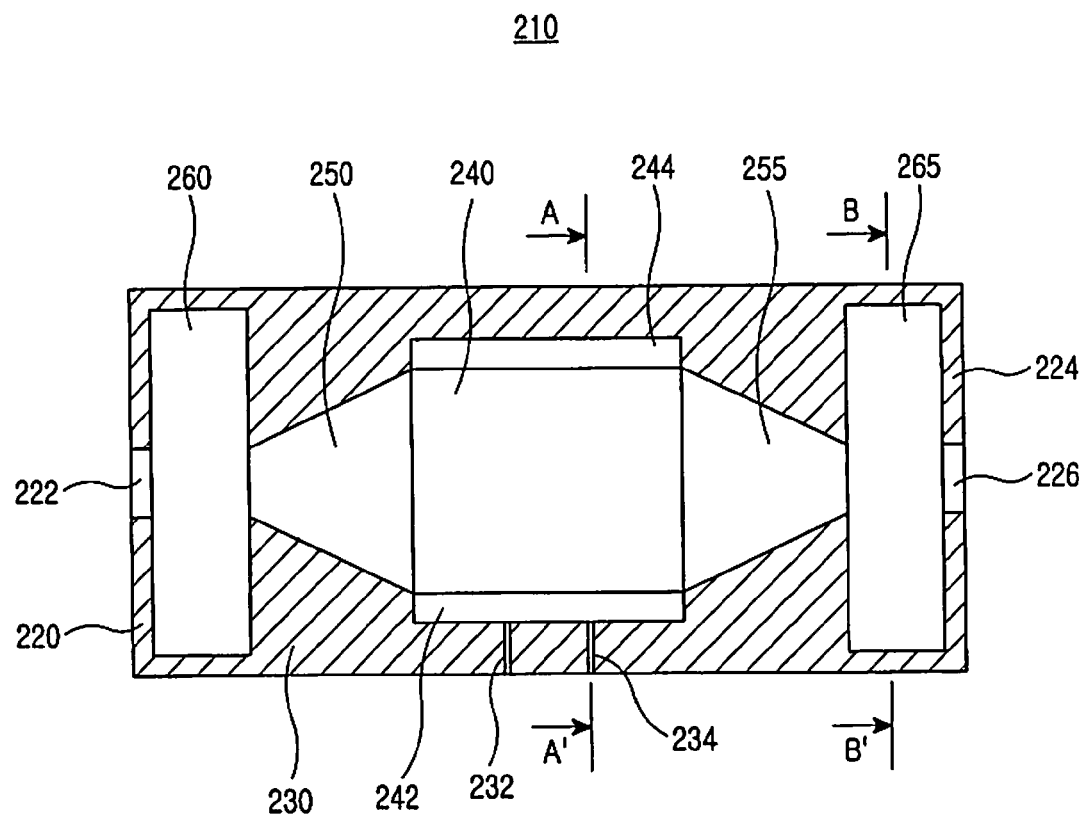
FIG. 5 is a cross-sectional view illustrating a housing as shown in FIG. 4.
Figure 6:
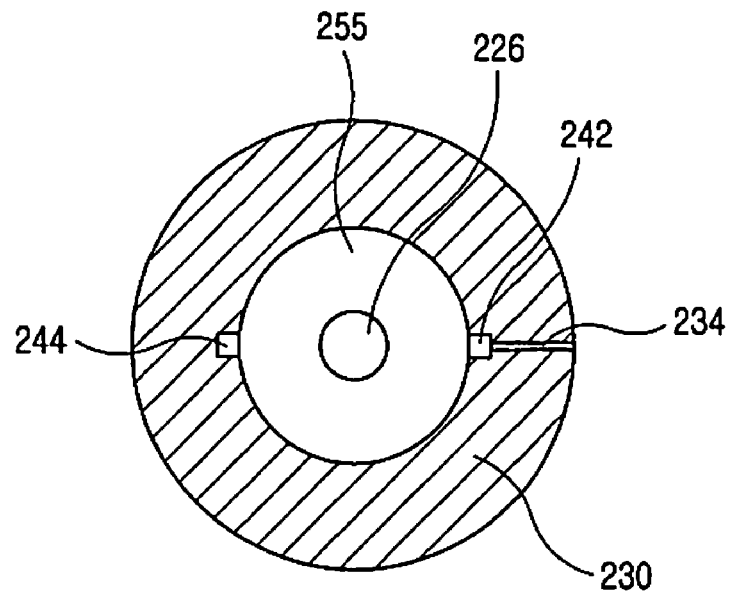
FIG. 6 is a cross-sectional view taken along the direction indicated by line A-A' of FIG. 5.
Figure 7:
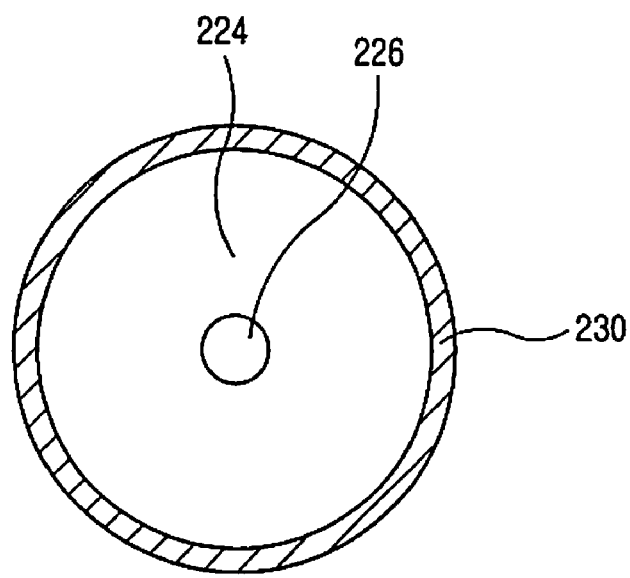
FIG. 7 is a cross-sectional view taken along the direction indicated by line B-B' of FIG. 5.

FIG. 5 is a cross-sectional view illustrating the housing 210, FIG. 6 is a cross-sectional view taken along line A-A' of FIG. 5, and FIG. 7 is a cross-sectional view taken along line B-B' of FIG. 5. The housing 210 has an overall long hollow cylindrical shape, and includes longitudinal walls 220 and 224 in a longitudinal direction (that is, lengthwise), which are formed with first and second longitudinal holes 222 and 226 for passing ends of the optical fiber 400 therethrough, and a side wall 230 in a transverse direction (that is, a diameter direction), which is formed with first and second side holes 232 and 236 for passing the connector pins 312 and 314 (FIG. 4) therethrough. The housing 210 includes a board receiving space 240 for receiving the circuit board 310, which is positioned at the center of the housing; first and second coupler receiving spaces 250 and 255 for receiving the first and second couplers 340 and 345, which are positioned at both sides of the board receiving space 240; and first and second optical fiber receiving spaces 260 and 265 for receiving first and second end portions 402 and 404 of the optical fiber 400, which are positioned at outer sides of the first and second coupler receiving spaces 250 and 255.

The board receiving space 240 has an overall cylindrical shape, and includes first and second stepped portions 242 and 244 which are opposite to each other and extend in a horizontal direction so as to support the circuit board 310.

The coupler receiving space 250 or 255 has a truncated cone shape, a first end contacting with the board receiving space 240 to communicate with the space, and a second end contacting with the corresponding optical fiber receiving space 260 or 265 to communicate with the space. Each coupler receiving space 250 or 255 has a width or diameter which decreases from the first end to the second end of the coupler receiving space 250 or 255.

Each optical fiber receiving space 260 and 265 has a disc shape, a first end coming in contact with the corresponding coupler receiving space 250 or 255 to communicate with the space, and a second end coming in contact with the corresponding longitudinal hole 222 or 226 to communicate with the corresponding hole.

The circuit board 310 is positioned within the board receiving space 240, and includes a driving circuit for driving the first and second light sources 320 and 330. The circuit board 310 is connected to the external circuit board through the connector pins 312 and 314, is supplied with the control signal and power supply from the external circuit board, and drives the first and second light sources 320 and 330 according to the control signal. As the circuit board 310, a conventional flexible printed circuit board may be used.

The first and second light sources 320 and 330 are mounted on opposite end portions of the circuit board 310, and each of the first and second light sources 320 and 330 generates and outputs light according to a driving signal provided from the circuit board 310. Each of the light sources 320 and 330 includes red, green and blue light emitting diodes 322, 324, and 326, or 332, 334, and 336, and controls the on/off state or output power of each of the corresponding light emitting diodes 322, 324, and 326, or 332, 334, and 336, thereby adjusting the color of the output light.

The first and second couplers 340 and 345 are positioned in the first and second coupler receiving spaces 250 and 255, respectively. The coupler 340 or 345 has a truncated cone shape, and has a width or diameter which decreases from a first end to a second end of the coupler 340 or 345. The first end of the coupler 340 or 345 faces the light emitting surface of the corresponding light source 320 or 330, and the other end of the coupler 340 or 345 faces the end of the corresponding end portion 402 or 404 of the optical fiber. As the width or diameter of the coupler 340 or 345 gradually decreases in a longitudinal direction, the coupler 340 or 345 converges the light input from the corresponding light source 320 or 330 and couples the converged light with the inside of the corresponding end portion 402 or 404 of the optical fiber. Also, since the light input to the coupler 340 or 345 is converged by multiple reflection at the side surfaces of the coupler 340 or 345, the coupler 340 or 345 uniformly mixes output of the red, green and blue lights. The coupler 340 or 345 may be made from a conventional glass material, and a mirror coating that layers a high reflectivity metal material on the side surface of the coupler 340 or 345 is preferably included to improve reflection efficiency.

The first and second light shielding members 350 and 354 are positioned in the first and second optical fiber receiving spaces 260 and 265, respectively, and each light shielding member has an overall hollow disc shape. Each light shielding member 350 and 354 includes a hole 352 and 356, respectively, which penetrates the center thereof, and the hole 352 or 356 is coaxially aligned with the corresponding coupler 340 or 345 and the corresponding longitudinal hole 222 or 226. The hole 352 or 356 preferably has a diameter matching the diameter of the optical fiber. The side surface of each light shielding member 350 or 354 comes in contact with an inner side surface of housing 210 to define the corresponding coupler receiving space 250 or 255. The light shielding member 350 or 354 shields light leaked by an optical coupling process of the end of the corresponding end portion 402 or 404 of the optical fiber with the other end of the corresponding coupler 340 or 345. Therefore, the light shielding member 350 or 354 is preferably made from an opaque or light-absorbing material.

In the above described first embodiment of the present invention, the light sources 320 and 330 and the optical fiber 400 are provided as one package type, and the optical fiber 400 of the optical fiber illumination device forms a closed loop, so as to minimize the leakage of remaining light i.e. light that has not been coupled with the optical fiber. Also, the structure of the device according to the first embodiment includes an electric connector, such as the connector pins 312 and 314, drawn to the outside of the light source module 202, an electrical contact (not shown), etc., which allows the device to be easily mounted to an external circuit board provided to a mobile phone, etc.

Meanwhile, unlike the above described first embodiment of the present invention, an open-type optical fiber illumination device may be required according to the design of appliances, such as a mobile phone. An overall rectangular block shape, instead of a cylindrical shape, light source module may be required for slimness of appliances. Also, in order to improve the appearance, a fabricated light source module may be realized in such a manner that it has a cross section of an oval shape, a rectangular shape with round edges (similar to a capsule shape), as well as other shapes.

Hereinafter, in the second embodiment of the present invention, an open-type optical fiber illumination device and a light source module having an overall rectangular block shape will be described, with redundant explanations omitted.

Figure 8:
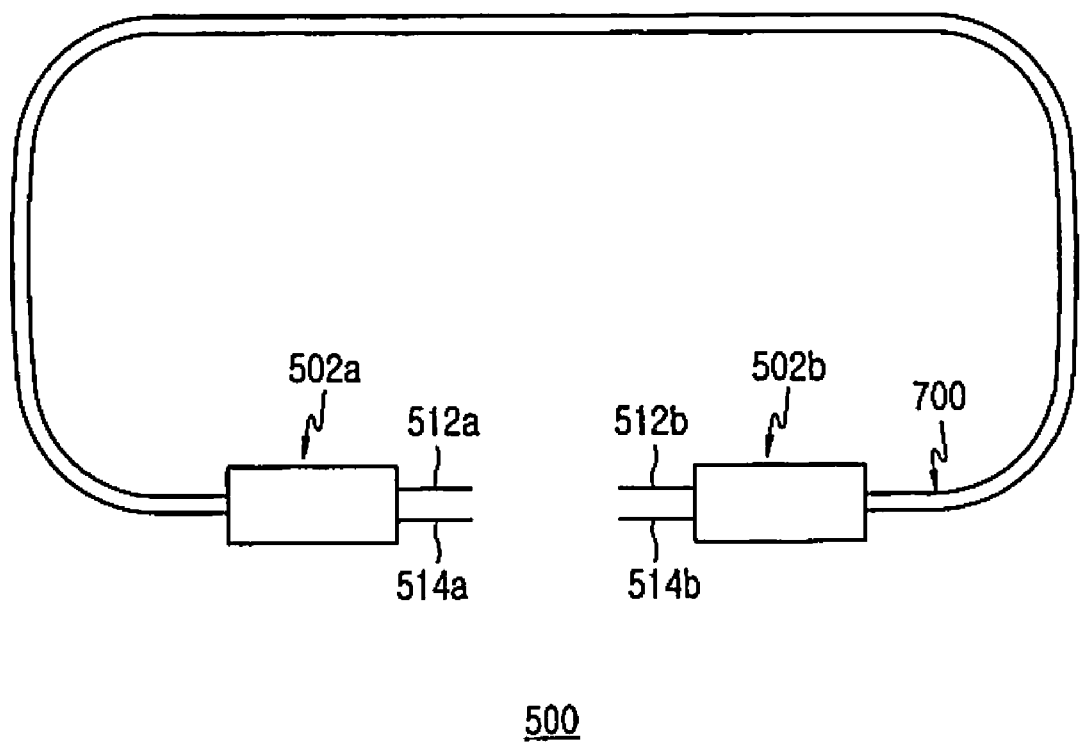
FIG. 8 is a view illustrating an optical fiber illumination device according to a second preferred embodiment of the present invention.

FIG. 8 is a view illustrating an optical fiber illumination device according to a second preferred embodiment of the present invention. The optical fiber illumination device 500 includes first and second light source modules 502a and 502b, and an optical fiber 700. Each the first light source module 502a and the second light source module 502b includes a pair of connector pins 512a and 514a, or 512b and 514b for connection with an external circuit board (not shown), and is supplied with a control signal and power supply from the external circuit board through the corresponding connector pins 512a and 514a, or 512b and 514b. The first and second light source modules 502a and 502b generate first light and second light, respectively, and rotate the first light and the second light on the optical fiber 700 in clockwise and counterclockwise directions, respectively.

As described in regard to optical cable 400 of the first embodiment, the optical fiber 700 includes a core having a relatively high refractive index and a cladding having a relatively low refractive index, and guides the light coupled therewithin.

Figure 9:
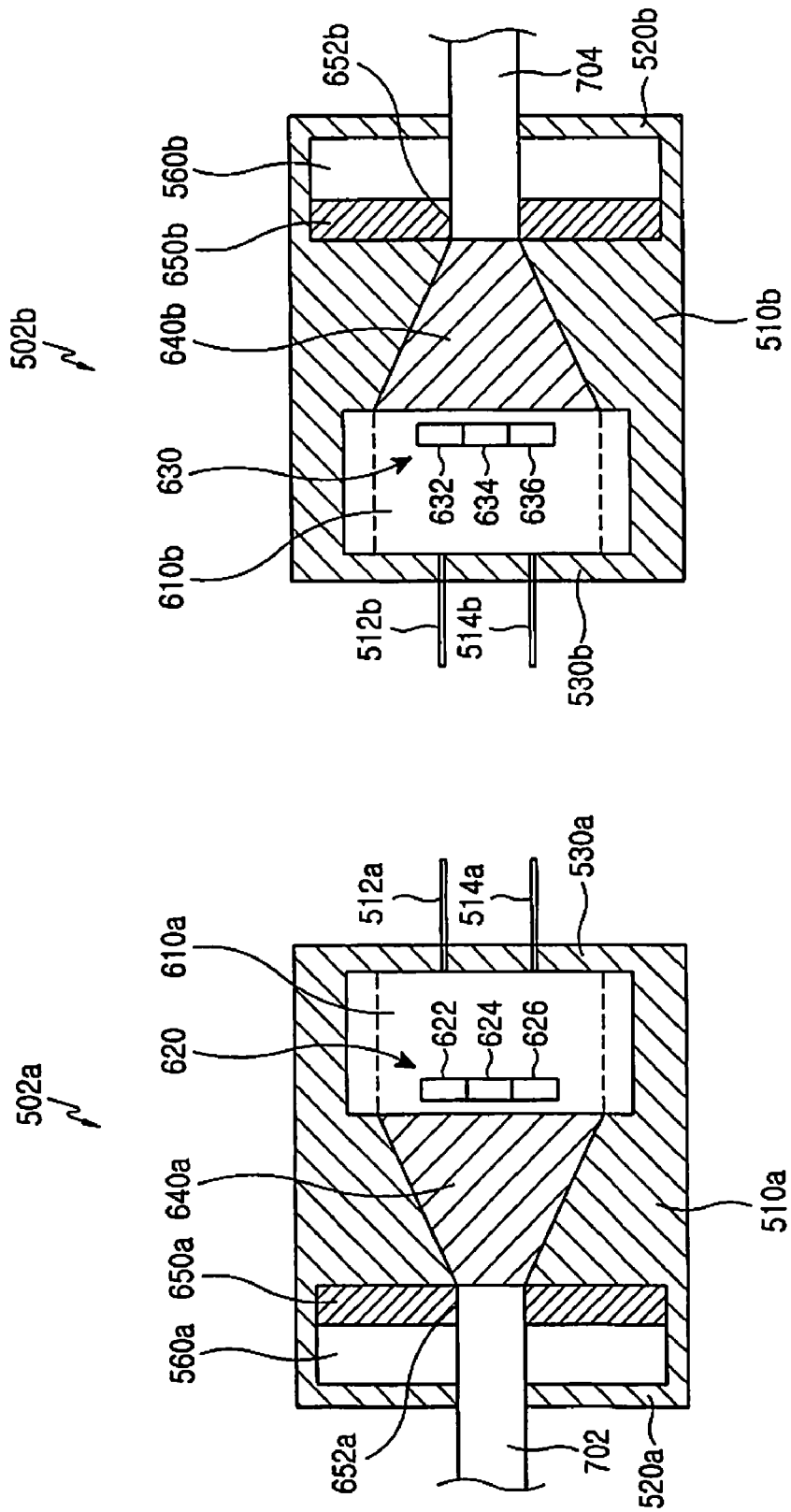
FIG. 9 provides cross-sectional views illustrating first and second light source modules as shown in FIG. 8.

FIG. 9 shows cross-sectional views illustrating the first and second light source modules 502a and 502b. The first light source module 502a includes a first circuit board 610a, a first light source 620, a first coupler 640a, a first light shielding member 650a, and a first housing 510a, and the second light source module 502b includes a second circuit board 610b, a second light source 630, a second coupler 640b, a second light shielding member 650b, and a second housing 510b.

The first and second housings 510a and 510b have the same configurations, and hereinafter the first housing 510a will be described in detail. The description of the components of the first housing 510a also apply to second housing 510b, with the components of first housing 510a having a suffix "a" and components of second housing 510b having a suffix "b".

Figure 10:
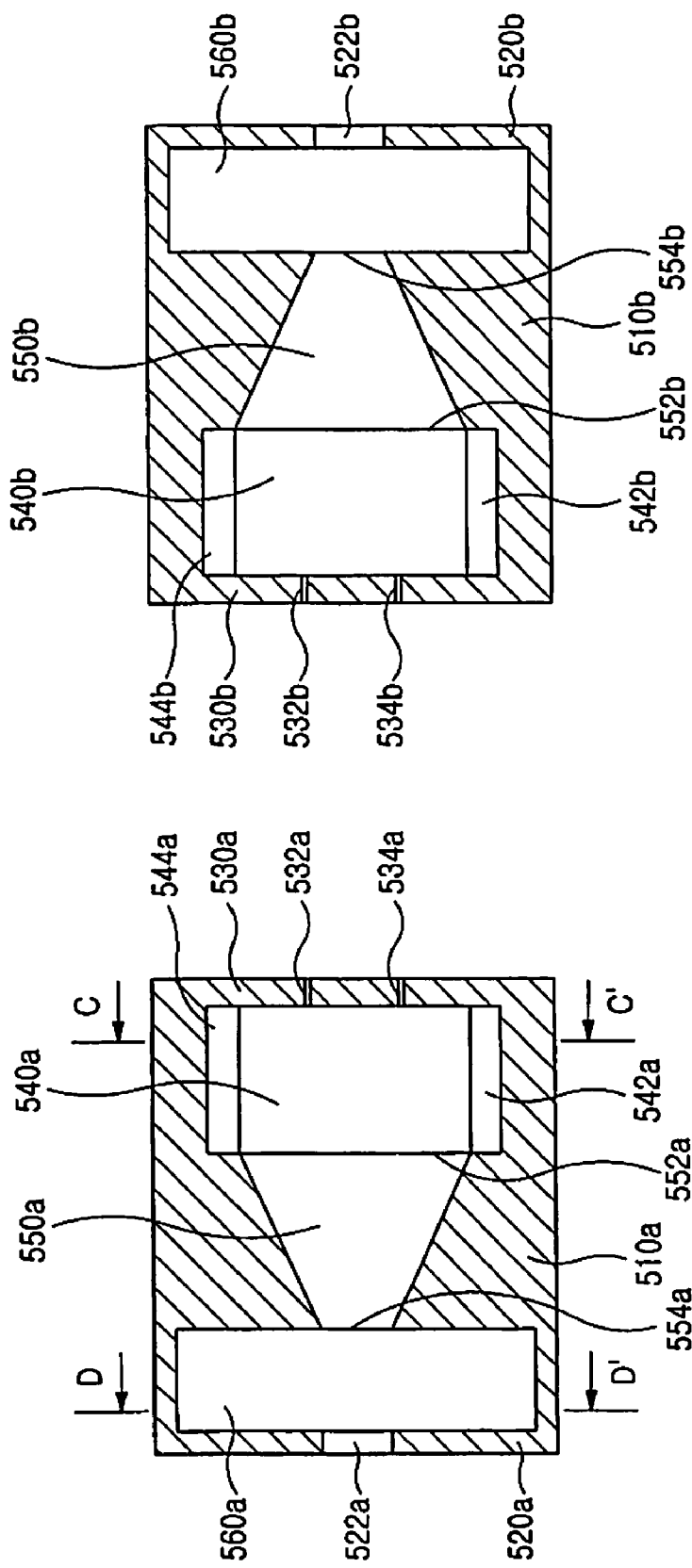
FIG. 10 provides cross-sectional views illustrating first and second housings as shown in FIG. 9.
Figure 11:
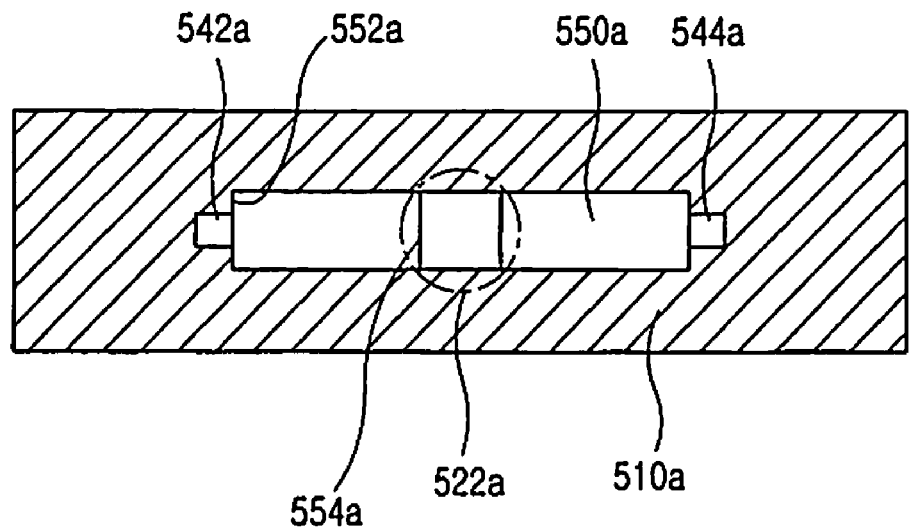
FIG. 11 is a cross-sectional view taken along the direction indicated by line C-C' of in FIG. 10.
Figure 12:
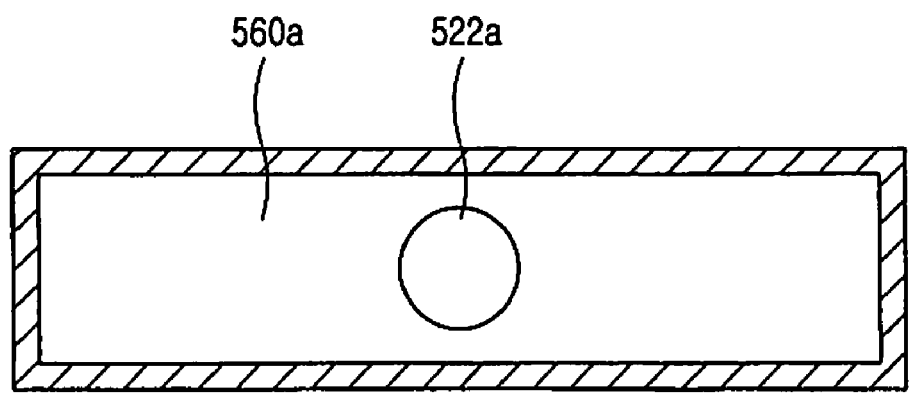
FIG. 12 is a cross-sectional view taken along the direction indicated by line D-D' of in FIG. 10.

FIG. 10 shows cross-sectional views illustrating the first and second housings 510a and 510b, FIG. 11 is a cross-sectional view from line C-C' of FIG. 10 of the first housing 510a, and FIG. 12 is a cross-sectional view line D-D' of FIG. 10 of the first housing 510a.

The housing 510a has an overall long hollow square pillar shape, and includes a first longitudinal wall 520a in a longitudinal direction (that is, lengthwise), which is formed with a first longitudinal hole 522a for passing a corresponding end portion 702 of the optical fiber 700 therethrough, and a second longitudinal wall 530a opposed to the first longitudinal wall 520a, which is formed with a pair of second longitudinal holes 532a and 534a for passing corresponding connector pins 512a and 514a therethrough. The housing 510a includes a board receiving space 540a for receiving the corresponding circuit board 610a; a coupler receiving space 550a for receiving the corresponding coupler 640a, which is positioned at one side of the board receiving space 540a; and an optical fiber receiving space 560a for receiving the corresponding end portion 702 of the optical fiber 700, which is positioned at one side of the coupler receiving space 550a.

The board receiving space 540a has an overall rectangular block shape, and includes a couple of stepped portions 542a and 544a, which are opposite to each other and extend in a horizontal direction so as to support circuit board 610a.

The coupler receiving space 550a has a trapezoidal block shape, a first end 552a contacting the corresponding board receiving space 540a to communicate with the space, and a second end 554a contacting the corresponding optical fiber receiving space 560a to communicate with the space. In the coupler receiving space 550a, the height is fixed while the width decreases from the first end 552a to the second end 554a of the coupler receiving space 550a.

The optical fiber receiving space 560a has a disc shape, a first end contacting the corresponding coupler receiving space 550a to communicate with the space, and a second end contacting the corresponding first longitudinal hole 522a to communicate with the hole.

The circuit board 610*a* is positioned within the corresponding board receiving space 540*a*, and includes a driving circuit for driving the corresponding light source 620. The circuit board 610*a* is connected to the external circuit board through the corresponding connector pins 512*a* and 514*a*, is supplied with the control signal and power supply from the external circuit board, and drives the corresponding light source 620 according to the control signal.

The light source 620 is mounted on circuit board 610*a* and generates and outputs light according to a driving signal provided from the circuit board 610*a*. The light source 620 includes red, green and blue light emitting diodes 622, 624, and 626.

The coupler 640*a* is positioned in the corresponding coupler receiving space 550*a*. The coupler 640*a* has a trapezoidal block shape, and has a width or diameter which decreases from a first end to a second end of the coupler 640*a*. In the coupler 640*a*, the first end faces a light emitting surface of the corresponding light source 620, and the second end faces the end of the corresponding end portion 702 of the optical fiber. As the width of the coupler 640*a* gradually decreases in the longitudinal direction, the coupler converges the light input from the corresponding light source 620 and couples the converged light with the inside of the corresponding end portion 702 of the optical fiber. Also, since the light input to the coupler 640*a* is converged by multiple reflection at the side surfaces of the coupler 640*a*, the coupler 640*a* performs a function of uniformly mixing red, green and blue lights.

The light shielding member 650*a* is positioned in the corresponding optical fiber receiving space 560*a*, and has an overall rectangular block shape. The light shielding member 650*a* includes a hole 652*a* which penetrates the center thereof, and the hole 652*a* is coaxially aligned with the corresponding coupler 640*a* and the corresponding first longitudinal hole 522*a*. The light shielding member 650*a* performs a function of shielding light leaked by an optical coupling process of the end of the corresponding end portion 702 of the optical fiber with the other end of the corresponding coupler 640*a*.

In the above described embodiments, a pair of light sources are provided. However, it is possible that only one light source is used, and an optical fiber's corresponding end portion which does not face the light source is terminated. As a light-reflecting or light-absorbing member used for such termination, a coating layer, a tape, a printed layer, a structure, etc. may be used. Also, a combination of a light-reflecting layer and a light-absorbing layer may be used.

In an optical fiber illumination device according to a third embodiment of the present invention, the second light source module 502*b* is removed from the configuration according to the second embodiment, and the optical fiber's corresponding end portion which does not face the light source is terminated. Hereinafter, an overlapped explanation will be omitted and only the termination member will be described in detail.

Figure 13:
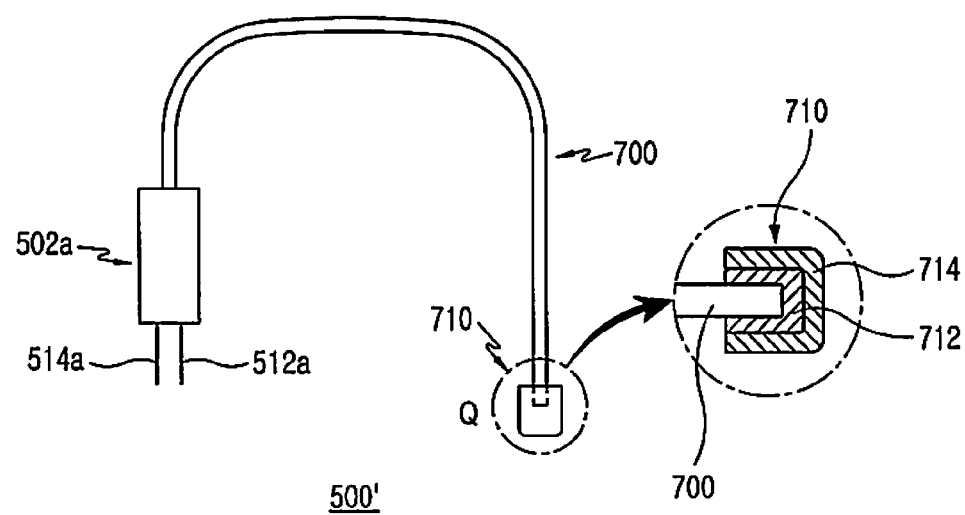
FIG. 13 is a view illustrating an optical fiber illumination device according to a third preferred embodiment of the present invention.

FIG. 13 is a view illustrating an optical fiber illumination device according to a third preferred embodiment of the present invention. The optical fiber illumination device 500 includes a light source module 502*a*, an optical fiber 700 and a termination member 710.

As shown in an enlarged cross-sectional view Q of FIG. 13, the termination member 710 is provided to a corresponding end portion of the optical fiber 700, the end portion not facing the light source, and includes a light-reflecting layer 712 layered on the corresponding end portion of the optical fiber 700, and a light-absorbing layer 714 layered on the light-reflecting layer 712. The light-reflecting layer 712 is layered in such a manner that it can completely cover the corresponding end of the optical fiber 700, and the light-absorbing layer 714 is layered in such a manner that it can completely cover the light-reflecting layer 712. The light-reflecting layer 712 reflects incident light, and the light-absorbing layer 714 absorbs the incident light. The termination member 710 performs a function of reducing light leakage and increasing optical efficiency by reflection.

The termination member 710 may be formed by a printing or coating process, or may be formed by 2-color-printing in which high optical reflectivity reflecting ink (such as metal ink or white ink) is printed and then high optical absorbency light shielding ink (such as black ink) is printed on the reflecting ink. Also, the termination member 710 may be formed by 1-color-printing in which only one of the high optical absorbency light shielding inks and high optical reflectivity reflecting inks is printed. In other words, the termination member 710 may include only one of the light-reflecting layer 712 and the light-absorbing layer 714, or may include the light-reflecting layer 712 and the light-absorbing layer 714 which is layered on the light-reflecting layer 712. In the latter case, the light-absorbing layer 714 absorbs the light transmitted from the light-reflecting layer 712. Instead of such a printing process, a gas or liquid phase coating process may be used.

Unlike the present embodiment, as the termination member 710, a conventional single or double-sided light shielding tape capable of absorbing or reflecting incident light may be used. When the double-sided light shielding tape is used, it is preferable that one surface of the tape includes a light reflecting material or color, and the other surface of the tape includes a light absorbing/shielding material or color. Also, as the termination member 710, a single-sided light shielding tape which has color capable of absorbing or reflecting incident light (for example, black or white) may be used.

The optical fiber illumination device according to one aspect of the present invention has an advantage of minimizing optical coupling loss and color non-uniformity by disposing, between a light source and an optical fiber, a coupler for converging and mixing the light output from the light source.

In the optical fiber illumination device according to another aspect of the present invention, an optical fiber having a light extraction pattern on the side surfaces thereof is variously disposed, and converged or mixed light is input to one end or both ends of the optical fiber. Thus, the device has an advantage in that it is appropriate for exterior decoration of a portable terminal.

In the optical fiber illumination device according to a further aspect of the present invention, a light source and an optical fiber are provided as one package type, and the optical fiber or the optical fiber illumination device forms a closed loop, so as to minimize the leakage of the remaining light that has not been coupled with the optical fiber. Also, the structure of the device includes a connector pin drawn to the outside of the light source module, or an electrical contact, which allows the device to be easily mounted to an external circuit board provided to a mobile phone, etc.

In the above embodiments, the light source module preferably connects to the external circuit board by using the connector pins. However, the light source module may be mounted on a circuit board provided to a portable terminal, such as a mobile phone, by forming a metal contact connected to the circuit board at the outside of the light source module, and using a conventional electrical connection method, such as a mounting method by a solder ball.

Also, in the above embodiments, the light source module includes a pair of light sources. However, it is possible to provide a configuration including only a single light source, in which the light input from the single light source is divided into two equal parts by using a beam splitter or a couple of mirrors, and the divided parts are input to the respective couplers. Also, respective configuration elements within the light source module may be fixed by adhesion (for example, epoxy), screw-fastening, or the like. In addition, the light source module may include one light source and one coupler, in which any one end portion of the optical fiber is terminated.

Also, in the above embodiments, the light sources 320 and 330 include RGB light emitting diodes, respectively, but may also include a monochromatic light emitting diode.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An optical fiber illumination device comprising:
a light source for outputting light;
a coupler for converging light from the light source through multiple reflection; and
an optical fiber to which the converged light is input from the coupler,
wherein the coupler has a first end facing a light emitting surface of the light source and the coupler has a second end facing the optical fiber, with the first end of the coupler and the second end of the coupler being opposite to each other, and the coupler has a width which gradually decreases from the first end of the coupler to the second end of the coupler.

2. The optical fiber illumination device as claimed in claim 1,
wherein the light source is mounted on a circuit board of the optical fiber illumination device with the light emitting surface of the light source facing the first end of the coupler.

3. The optical fiber illumination device as claimed in claim 1, further comprising a light shielding member for shielding light leaked by an optical coupling process between the coupler and the optical fiber.

4. The optical fiber illumination device as claimed in claim 3, further comprising an electrical connection for connecting the circuit board to an external circuit board.

5. An optical fiber illumination device comprising:
a housing within which both end portions of an optical fiber are disposed in opposite directions;
at least one light source disposed within the housing; and
a pair of couplers disposed at opposite sides of the at least one light source, the couplers being disposed with a first end of each coupler facing an end of the corresponding end portion of the optical fiber, and converging light input from the at least one light source by multiple reflection.

6. The optical fiber illumination device as claimed in claim 5, wherein each of the couplers has a width which gradually decreases from a second end to the first end thereof.

7. The optical fiber illumination device as claimed in claim 5, further comprising a circuit board provided with an electrical connection to an external circuit board, wherein the optical fiber illumination device comprises a pair of light sources, and
each the light source is mounted on the circuit board with a light emitting surface thereof facing the second end of the corresponding coupler.

8. The optical fiber illumination device as claimed in claim 5, further comprising a couple of light shielding members for shielding light leaked by an optical coupling process between the corresponding coupler and the corresponding end portion of the optical fiber, the light shielding members being arranged with each shielding member surrounding the corresponding end portion of the optical fiber.

* * * * *